United States Patent
Müller et al.

(10) Patent No.: US 12,480,863 B2
(45) Date of Patent: Nov. 25, 2025

(54) MEASURING CELL FOR PERFORMING OPTICAL MEASUREMENTS

(71) Applicant: Endress+Hauser Conducta GmbH+Co. KG, Gerlingen (DE)

(72) Inventors: Andreas Müller, Ostfildern (DE); Hans Meyer, Eschach (DE); Matthias Großmann, Vaihingen-Enz (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 133 days.

(21) Appl. No.: 18/509,406

(22) Filed: Nov. 15, 2023

(65) Prior Publication Data

US 2024/0159654 A1    May 16, 2024

(30) Foreign Application Priority Data

Nov. 15, 2022    (DE) .................. 10 2022 130 221.0

(51) Int. Cl.
*G01N 21/03*    (2006.01)
*G01J 3/02*     (2006.01)
(Continued)

(52) U.S. Cl.
CPC ............ *G01N 21/03* (2013.01); *G01J 3/0205* (2013.01); *G01N 2021/0193* (2013.01);
(Continued)

(58) Field of Classification Search
CPC .... G01N 21/03; G01N 21/0303; G01N 21/17; G01N 2021/0193; G01N 2021/0378;
(Continued)

(56) References Cited

U.S. PATENT DOCUMENTS

| | | | |
|---|---|---|---|
| 7,369,226 B1 | 5/2008 | Hewitt | |
| 2014/0240701 A1* | 8/2014 | Wynn | G01N 21/05 356/246 |

(Continued)

FOREIGN PATENT DOCUMENTS

| | | |
|---|---|---|
| DE | 102011013002 B3 | 8/2012 |
| DE | 102013101196 A1 | 9/2013 |
| JP | 2009180665 A * | 8/2009 |

*Primary Examiner* — Michelle M Iacoletti
*Assistant Examiner* — Judy Dao Tran
(74) *Attorney, Agent, or Firm* — Christopher R. Powers; Endress+Hauser (USA) Holding, Inc.

(57) ABSTRACT

A measuring cell for performing optical measurements of a medium disposed in the measuring cell includes: recesses extending through a first outer wall and a second outer wall of the measuring cell; and two window mounts, each with a transparent window therein and each including outward protruding projections configured to be inserted a corresponding recess at a selected installation depth, wherein a wall of the measuring cell that surrounds the recess includes on an inside, for each selectable installation depth, one set of contact surfaces arranged around the recess in a radial direction such that the projections of the window mount seat on the contact surfaces of the corresponding set, which are arranged in an axial direction such that the window mount is arranged in the recess at the selected installation depth.

19 Claims, 3 Drawing Sheets

(51) Int. Cl.
  *G01N 21/01*    (2006.01)
  *G01N 21/17*    (2006.01)
(52) U.S. Cl.
  CPC . *G01N 21/0303* (2013.01); *G01N 2021/0378* (2013.01); *G01N 2021/0389* (2013.01); *G01N 21/17* (2013.01)
(58) Field of Classification Search
  CPC ......... G01N 2021/0389; G01N 21/534; G01N 2021/513; G01N 2021/6482; G01N 21/05; G01N 21/01; G01N 21/25; G01N 21/31; G01N 21/6428; G01J 3/0205; G01F 1/661; G01F 15/18
  See application file for complete search history.

(56)        References Cited

U.S. PATENT DOCUMENTS

2017/0254361 A1*  9/2017  Breitfeld ............... B62K 25/02
                                                    384/519
2019/0072481 A1*  3/2019  Simpkin ............... G01J 3/0218
                                                    356/244
2020/0362292 A1* 11/2020  Hoehse ................. G01N 21/64
                                                    435/29

* cited by examiner

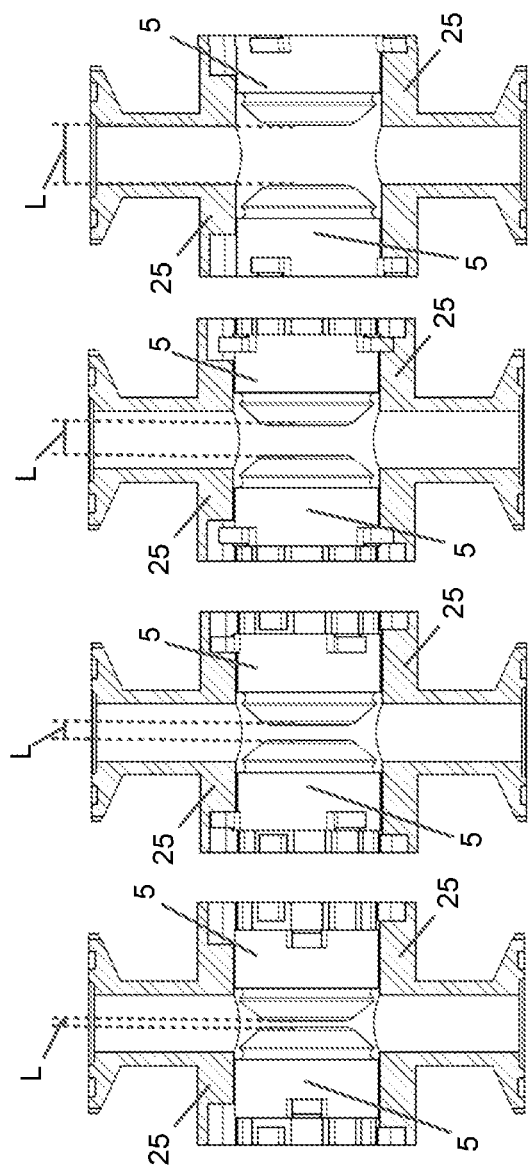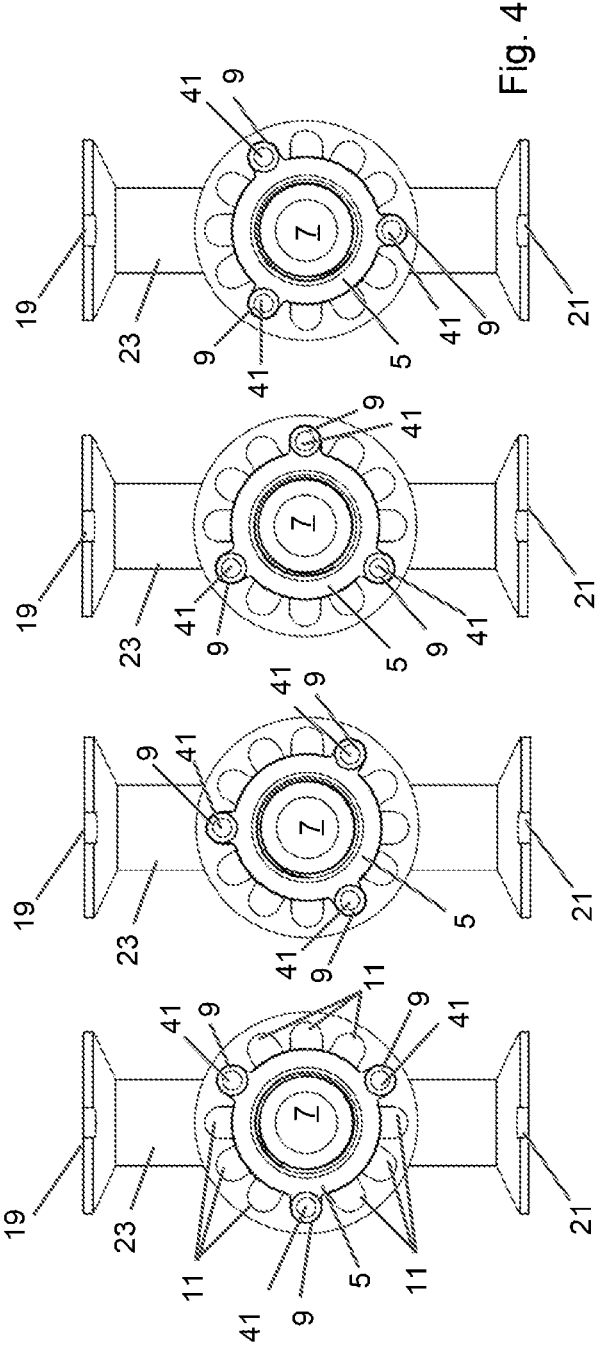

MEASURING CELL FOR PERFORMING OPTICAL MEASUREMENTS

CROSS-REFERENCE TO RELATED APPLICATION

The present application is related to and claims the priority benefit of German Patent Application No. 10 2022 130 221.0, filed Nov. 15, 2022, the entire contents of which are incorporated herein by reference.

TECHNICAL FIELD

The present disclosure relates to a measuring cell for performing optical measurements of at least one measured variable of a medium located in the measuring cell or flowing through the measuring cell.

BACKGROUND

Measuring cells, such as flow cells, are used in a multiplicity of different applications to perform optical measurements of at least one measured variable of a medium located in the measuring cell or flowing through the measuring cell.

Flow cells regularly have two windows which are inserted in their opposite outer walls and through which optical measurements of measured variables of a medium flowing through the flow cell can be performed by means of correspondingly designed optical sensors. An example of a conventional measuring device that can be used for this purpose with a flow cell and a sensor is shown in FIG. 1. With such a measuring device, for example, by means of a transmitting device S of the sensor, such as a light source, transmitted radiation is sent into the flow cell Z through one of the windows F. In addition, measurement radiation which results from an interaction of the transmitted radiation along an optical path L extending through the medium located in the flow cell Z and emerges from the opposite window F is received by means of a measuring device M of the sensor, which measuring device is designed to determine and provide measured values m of at least one measured variable of the medium on the basis of the received measurement radiation.

With optical sensors, different measured variables can be measured depending upon the type of the sensor and/or the interaction, such as absorption, reflection, scattering or fluorescence. Examples known from the prior art comprise turbidity sensors for measuring turbidity of the medium, sensors for measuring a solids concentration contained in the medium, fluorescence sensors, and absorption sensors, such as sensors for measuring a spectral absorption coefficient or a concentration of an analyte contained in the medium.

For optical measurements performed through flow cells, the optical path length L along which the interaction with the medium takes place usually corresponds to the distance between the opposite windows. This optical path length L plays an important role with regard to both the measurement range and the measurement accuracy. To achieve reproducible and/or comparable measurement results with high measurement accuracy, it is often necessary to measure the optical path length L as precisely as possible. In addition, optical path lengths L of different sizes are often required or at least advantageous for different measurement tasks. For example, for absorption measurements of strongly absorbing media, a short optical path length L is preferably used in order to be able to receive measurement radiation of sufficiently high intensity. Conversely, for absorption measurements of only very weakly absorbing media, a significantly longer optical path length L is preferably used to achieve a sufficiently high measurement effect.

DE 10 2013 101 196 A1 describes an inline optical sensor with a flow cell block made of stainless steel. The flow cell block comprises two opposite outer walls, each having a recess in which a transparent window is clamped with the interposition of a seal. To achieve an adjustability in steps of the optical path length, the windows are installed with the interposition of spacers, which can be selected from a group of spacers designed as individual parts of different sizes. In addition, DE 10 2013 101 196 A1 describes how to perform fine adjustment of the windows and thus also of the optical path length by compressing the seals accordingly by means of a clamping device. This may be used, for example, to compensate for manufacturing tolerances.

The use of spacers enables the inline sensor to be adapted to different measurement tasks. The disadvantage, however, is that the spacers must each be prefabricated, selected and installed as individual parts. Accordingly, additional costs are associated with the production and stocking of different spacers. In addition, the use of the spacers leads to an increase in the number of different components required for the inline sensor.

There are a multiplicity of applications, such as applications in biotechnology, in which flow cells are increasingly intended for single use only (e.g., disposable, "single-use") for hygienic reasons and/or to avoid contamination. This results in the requirement for as cost-effective a production as possible and as simple a manageability as possible.

Disposable flow cells known from the prior art comprise flow cells manufactured with high mechanical precision and with windows bonded to them. In addition to the high manufacturing costs due to the precision required, such flow cells have the disadvantage that a complex bonding process is required. Such bonding process can be avoided by using windows pressed into the disposable flow cell. However, in both cases, there is the problem that different optical path lengths regularly necessitate the use of different windows projecting into the interior space of the disposable flow cell to different extents in the bonded state. However, the production and stocking of correspondingly shaped windows, which are often specially made for this purpose, is associated with correspondingly high additional costs.

SUMMARY

The present disclosure specifies a versatile, cost-effectively producible measuring cell, which has an adjustable optical path length and, in particular, manages with the smallest possible number of different components.

For this purpose, one aspect the present disclosure comprises a measuring cell for performing optical measurements of at least one measured variable of a medium disposed in the measuring cell or flowing through the measuring cell, with:
- a recess extending through a first outer wall of the measuring cell and/or a recess extending through a second outer wall of the measuring cell opposite the first outer wall, and
- one or two window mount(s) with a transparent window, wherein the window mount, at least one of the window mounts or each window mount, respectively:
- has a predetermined number of at least two or three or more radially outward protruding projections, and can be inserted or is inserted into the recess, assigned to the respective window mount, at an installation depth that can be selected from at least two different installation depths, wherein a wall of the measuring cell that surrounds such recess on the outside on all sides has, on the inside, for each selectable installation depth, in each case one set of contact surfaces that correspond to the number of projections and are arranged distributed around the recess in the radial direction with respect to a longitudinal axis of the recess in such a manner that the projections of the window mount can be brought to rest on the contact surfaces of the respective set, and are arranged in the axial direction in such a manner that the window mount is arranged in the recess at the installation depth assigned to the respective set of contact surfaces, if its projections rest on the contact surfaces of the respective set of contact surfaces.

The selectable installation depth of the window mount(s) offers the advantage that the optical path length along which the interaction with the medium located in the measuring cell or flowing through the measuring cell takes place during optical measurements performed through the recess(es) through the measuring cell can be adjusted in steps.

The contact surfaces designed in particular as an integral component of the wall(s) surrounding the recess(es) offer the advantage that neither spacers nor other additional components are required to achieve the different installation depths and thus also the accompanying different optical path lengths, and the installation of the window mount(s) can be performed in a very simple manner.

A further advantage is that the selection of the installation depths can be performed completely independently of the shape of the windows. This offers the advantage that windows of different shapes do not have to be kept in stock and there are no special requirements for the shape of the windows. Accordingly, a window shape that can be produced cost-effectively can be easily used.

According to one embodiment, the measuring cell is designed as a flow cell and/or a disposable measuring cell.

According to a second embodiment, the measuring cell comprises two window mounts of identical construction, one or both of which can be inserted or is inserted into the associated recess at the installation depth that can be selected from at least two different installation depths.

A third embodiment provides that the projections of the or each window mount are each coplanar in a plane, and the contact surfaces of each set of contact surfaces are each arranged in a plane corresponding to the associated installation depth.

According to a development, the measuring cell comprises a measuring cell body that surrounds an interior space of the measuring cell, which comprises the wall(s) surrounding the recess(es) and which comprises the sets of contact surfaces.

According to one embodiment of the development, the measuring cell body is designed as a one-piece body, made of a plastic and/or of a sterilizable material, and/or designed as an injection-molded part.

According to an additional development, the recess, at least one of the recesses or each recess comprises a respective region that extends through a connection piece that is externally adjacent to or integrally formed on that outer wall through which the respective recess extends.

In a fourth embodiment, the or each window mount comprises a respective adjustable clamping device, by means of which the window can be clamped or is clamped in the respective window mount with the interposition of a window seal, and which is designed in such a manner that a compression of the window seal can be adjusted via the clamping device, which causes a fine adjustment of the window, corresponding to the compression, within the window mount in a direction parallel to the longitudinal axis of the window mount.

According to one embodiment of the fourth embodiment, the or each clamping device comprises a respective screw ring which can be screwed or is screwed into the respective window mount and by means of which an outer edge of the window and the window seal adjacent thereto can be clamped or is clamped between the screw ring and a counter bearing of the clamping device in a manner that can be adjusted via the screw ring.

According to one embodiment of the latter embodiment, the or each counter bearing comprises a respective radially inward extending shoulder of the window mount, which on the outside on all sides surrounds an opening of the respective window mount facing the interior space of the measuring cell when the window mount is installed.

Further embodiments of the measuring cell include:
a process seal is provided for each window mount for sealing an annular gap existing between the window mount and the wall of the measuring cell bounding the recess on the outside, when the window mount is installed,
each window mount has a respective groove extending around the outside of its circumference for receiving the process seal, and/or
each window is disk-shaped, is designed as a disk-shaped window with a disk thickness of 1 mm to 5 mm, and/or is inserted substantially flush with the front in a front region of the respective window mount facing the interior space of the measuring cell in the installed state.

A further embodiment provides that a region of the or each window mount projecting into the interior space of the measuring cell in the installed state has a rounded outer contour in each case.

Further embodiments consist in that the measuring cell comprises fastening means for fastening the or each window mount, and/or comprises fastening means designed as screws, which can be screwed or are screwed through the projections into the measuring cell body of the measuring cell.

Furthermore, the present disclosure comprises a measuring device with a measuring cell according to the present disclosure and an optical sensor for measuring at least one measured variable of a medium disposed in the measuring cell or flowing through the measuring cell.

Embodiments of the measuring device include:
the sensor is designed as a turbidity sensor for measuring a turbidity of the medium, as a sensor for measuring a solids concentration contained in the medium, as a fluorescence sensor, as an absorption sensor, as a sensor for measuring a spectral absorption coefficient or as a sensor for measuring a concentration of an analyte contained in the medium, and/or
the sensor comprises a transmitting device, in particular a transmitting device designed as a light source, and a measuring device,
wherein the transmitting device can be positioned or is positioned outside the measuring cell in such a manner that transmitted radiation can be transmitted into the measuring cell by means of the transmitting device, and wherein the measuring device or at least one detector contained in the measuring device can be positioned or is positioned outside the measuring cell in such a manner that, by means of the measuring device, measurement radiation which results from an interaction of the transmitted radiation along an optical path extending through the medium located in the measuring cell or flowing through the measuring cell and emerges from the measuring cell can be or is received by means of the measuring device.

BRIEF DESCRIPTION OF THE DRAWINGS

The present disclosure and its advantages will now be explained in detail using the figures in the drawing, which show one exemplary embodiment. The same elements are indicated by the same reference numbers in the figures.

FIGS. 4a-4d show side views and partially sectioned views of the measuring cell of FIGS. 2 and 3 at different installation depths of the window mounts.

DETAILED DESCRIPTION

Figure 2:
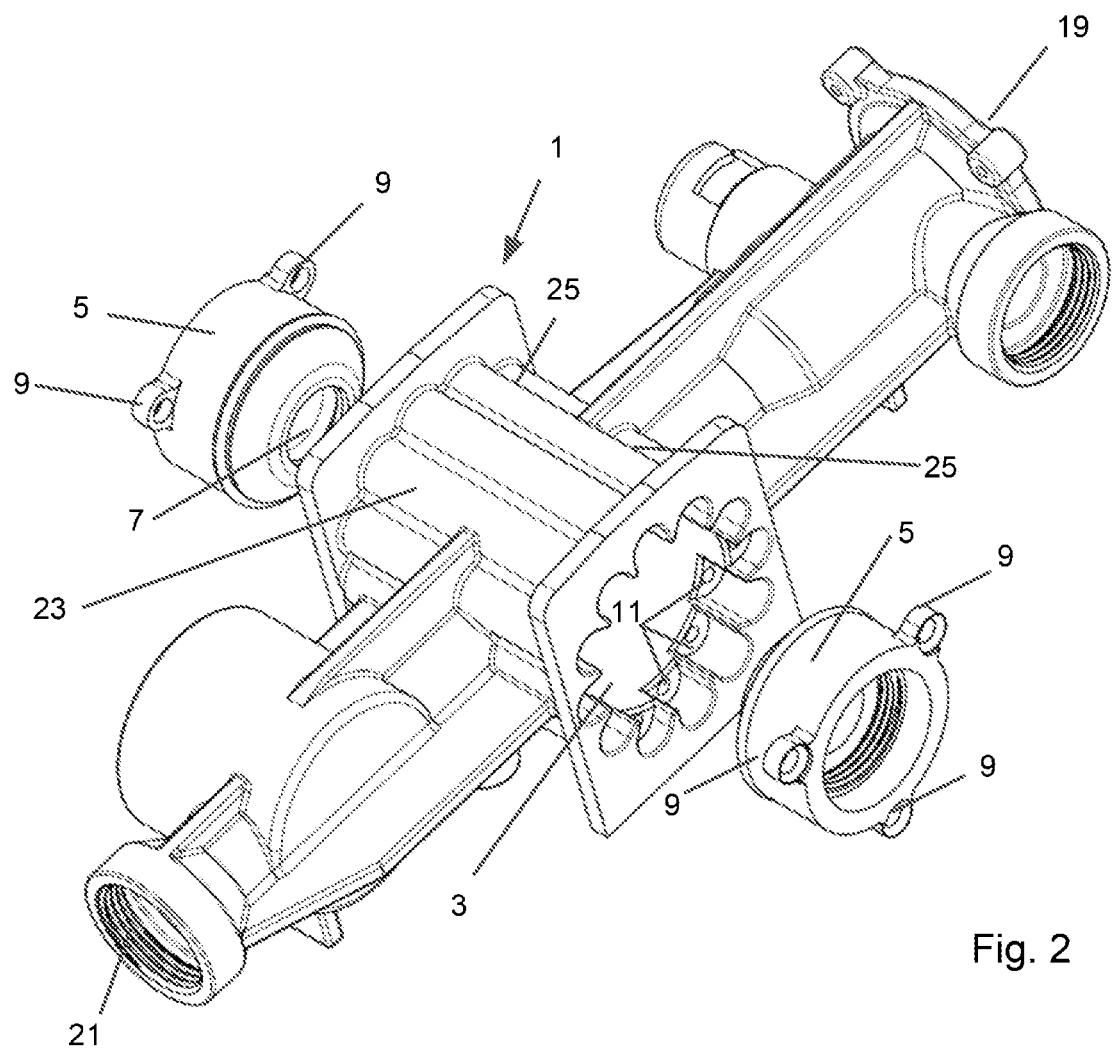
FIG. 2 shows a perspective view of a measuring cell according to the present disclosure.

The present disclosure comprises a measuring cell 1 for performing optical measurements of at least one measured variable of a medium located in the measuring cell 1 or flowing through the measuring cell 1. FIG. 2 shows a view and FIG. 3 shows a sectional drawing of an exemplary embodiment of a measuring cell 1.

The measuring cell 1 comprises a recess 3 extending through a first outer wall of the measuring cell 1 and/or a recess 3 extending through a second outer wall of the measuring cell 1 opposite the first outer wall. In addition, the measuring cell 1 comprises one or two window mount(s) 5, each insertable or inserted into the recess(es) 3.

Figure 3:
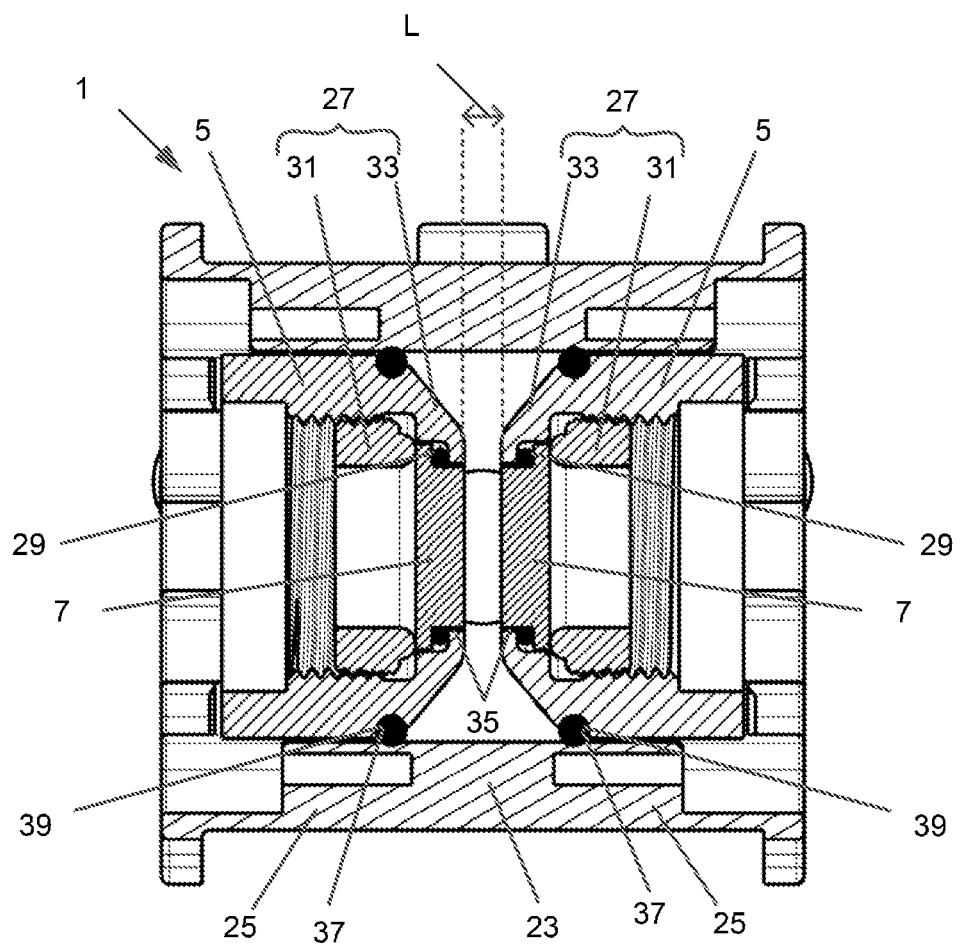
FIG. 3 shows a sectional drawing of the measuring cell shown in FIG. 2.

As can be seen from FIGS. 2 and 3, a transparent window 7 is inserted into the or each window mount 5 and optical measurements of at least one measured variable of a medium disposed in the measuring cell 1 or flowing through the measuring cell 1 can be performed through said window 7 when the window mount 5 is inserted into the recess 3.

As shown in FIG. 2, the window mount 5, at least one of the window mounts 5 or each of the two window mounts 5 each has a predetermined number of at least two, preferably three or more radially outward protruding projections 9 by means of which the respective window mount 5 can be inserted in the associated recess 3 at an installation depth that can be selected from at least two different installation depths. For this purpose, a wall of the measuring cell 1 surrounding the associated recess 3 on the outside on all sides has, on the inside, for each selectable installation depth, in each case one set of contact surfaces 11 corresponding to the number of projections 9. The contact surfaces 11 of each set are arranged distributed around the recess 3 in the radial direction with respect to a longitudinal axis of the recess 3 in such a manner that the projections 9 of the window mount 5 to be inserted into the recess 3 can be brought to seat on the contact surfaces 11. In addition, they are arranged in the axial direction in such a manner that the window mount 5 is arranged in the recess 3 at the installation depth assigned to the respective set of contact surfaces 11, if its projections 9 seat on the contact surfaces 11 of the respective set of contact surfaces 11. The projections 9 seat, for example, directly or with the interposition of a component, such as a seal and/or a washer, on the contact surfaces 11 of the respective set. As non-limiting examples, each projection 9 may be characterized as a boss, an arm, and/or a tab.

This configuration results in a particularly angle-coded arrangement of the sets of contact surfaces 11, which makes it possible to achieve the selected installation depth by aligning the projections 9 of the window mount 5 to be inserted, by rotating the window mount 5 about its longitudinal axis in such a manner that, when the window mount 5 is inserted axially into the associated recess 3, they come to rest on the contact surfaces 11 of the set with which the selected installation depth is achieved.

The selection of the installation depth of the or each window mount 5 also adjusts the optical path length L along which the interaction with the medium located in the measuring cell 1 or flowing through the measuring cell 1 occurs during an optical measurement performed through the window(s) 7 of the window mount(s) 5. This is illustrated in FIGS. 4a-4d using four pairs of illustrations as examples. The lower illustration of each pair of illustrations shows a view of one of the two window mounts 5 inserted into the measuring cell 1 shown in FIGS. 2 and 3, and the associated upper illustration shows a partially sectioned view of the measuring cell 1 with the two window mounts 5 inserted therein. In the pairs of illustrations shown, the installation depth at which the window mounts 5 are inserted into the recesses 3 decreases from left (FIG. 4a) to right (FIG. 4d). Accordingly, the optical path length L of the measuring cell 1 corresponding to the distances of the two windows 7 from one another increases from FIG. 4a to FIG. 4d.

In principle, it is sufficient for the adjustability in steps of the optical path length L if only the first outer wall of the measuring cell 1 has the recess 3 described above, into which the associated window mount 5 with the installation depth that can be selected from a plurality of installation depths can be inserted. In such case, for example, a window mounted in a different manner is provided in the opposite second outer wall.

Alternatively, a window mount 5 may be or is inserted into each of the two recesses 3, but only one of the two walls surrounding each of the recesses 3 may be designed in such a manner that it enables a plurality of different installation depths, while the second wall surrounding the other recess enables only a single installation depth of the window mount 5 that can be inserted therein. For this purpose, the second wall may comprise only a single set of contact surfaces, for example. In conjunction with projections 9 arranged coplanar, the second wall may alternatively have a single, annular contact surface on which the projections 9 are brought to rest.

In the measuring cell 1 shown in FIGS. 2, 3 and 4a-4d, the first and second outer walls each have one of the two recesses 3, into each of which one of the window mounts 5 with a selectable installation depth can be inserted. This embodiment offers the advantage that a correspondingly larger number of optical path lengths L can be realized via the two installation depths (e.g., on both sides of the measuring cell) that are adjustable in steps.

Figure 1:
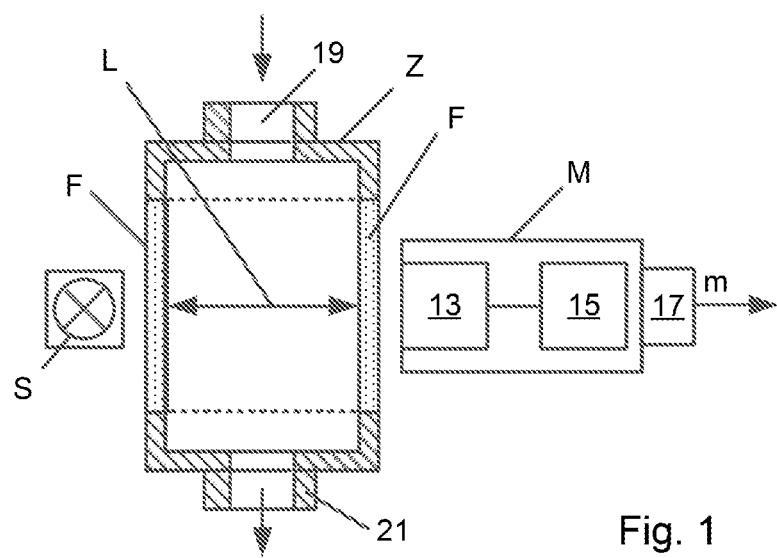
FIG. 1 shows a schematic of a conventional measuring device having a flow cell and a sensor.

Furthermore, the present disclosure comprises a measuring device comprising the previously described measuring cell 1 and a sensor designed to perform measurements of at least one measured variable of the medium disposed in the measuring cell 1 or flowing through the measuring cell 1. The measuring device according to the present disclosure s constructed, for example, analogously to the measuring device shown in FIG. 1, wherein the measuring cell 1 according to the present disclosure, such as the measuring cell 1 described with reference to FIGS. 2 to 4, is used in place of the measuring cell Z shown in FIG. 1.

Suitable sensors are, for example, sensors known from the prior art that comprise a transmitting device S, such as a light source, and a measuring device M. In such a case, the transmitting device S can be positioned or is positioned outside the measuring cell 1 in such a manner that transmitted radiation can be transmitted through one of the windows 7 into the measuring cell 1 by means of the transmitting device S. In addition, the measuring device M or at least one detector 13 contained in the measuring device M can be positioned or is positioned outside the measuring cell 1 in such a manner that, by means of the measuring device M, measurement radiation which results from an interaction of the transmitted radiation along the optical path L extending through the medium located in the measuring cell 1 and emerges from the opposite window 7 of the measuring cell 1 can be or is received by means of the measuring device M of the sensor. As in sensors known from the prior art, the measuring device M is also designed here to determine and provide measured values m of at least one measured variable of the medium on the basis of the received measurement radiation. For this purpose, the measuring device M comprises, for example, an evaluation device 15 which is connected to the detector 13 and determines the measured values m on the basis of the measurement signals or measurement information output by the detector 13 and displays them, outputs them and/or makes them available in readable form via an interface 17 connected thereto.

The sensor is designed, for example, as a turbidity sensor for measuring a turbidity of the medium, as a sensor for measuring a solids concentration contained in the medium, as a fluorescence sensor, or as an absorption sensor, for example, as a sensor for measuring a spectral absorption coefficient or a concentration of an analyte contained in the medium.

The measuring cell 1 and the measuring device of present disclosure have the advantages mentioned above. Individual components of the measuring cell 1 and/or the measuring device may each have embodiments that can be used individually and/or in combination with one another.

For example, the measuring cell 1 shown here as an example is configured as a flow cell through which the medium 1 can flow. For this purpose, the flow cell shown in FIGS. 2 to 4 comprises an inlet 19, to which a supply line not shown in the figures can be connected, via which supply line the medium 1 can be supplied to the flow cell, and an outlet 21, to which a discharge line not shown in the figures can be connected, via which discharge line the medium 1 can be discharged from the flow cell.

Alternatively or in addition thereto, the measuring cell 1 comprises, for example, a measuring cell body 23 that surrounds and defines an interior space of the measuring cell 1. In this case, the measuring cell body 23 comprises the wall(s) which surround the recess(es) 3 and in turn comprise the sets of contact surfaces 11. The measuring cell body 23 is designed, for example, as a one-piece (e.g., monolithic) body into whose recess(es) 3 the window mount(s) 5 can be inserted or is/are inserted. A body made of a plastic and/or a sterilizable material is particularly suitable as a measuring cell body 23. Alternatively or in addition thereto, the measuring cell body 23 is designed, for example, as an injection-molded part. The latter is advantageous in particular in connection with measuring cells 1 designed and/or used as disposable measuring cells, because it is possible to use a single injection mold to cost-effectively produce large numbers of measuring cell bodies 23 which contain the various sets of contact surfaces 11 and from which measuring cells 1 with different optical path lengths L can then be produced in a very simple and cost-effective manner due to the selectable installation depth(s) of the window mount(s) 5.

With regard to the range of different installation depths or the optical path lengths L corresponding thereto, the recess 3, at least one of the recesses 3 or each recess 3 has, for example, in each case a region that extends through a connection piece 25 externally adjacent to or integrally formed on the outer wall through which the respective recess 3 extends. This offers the advantage that installation depths of very different sizes can be realized even with a low wall thickness of the respective outer wall.

In measuring cells 1 with two window mounts 5 inserted in their opposite recesses 3, the window mounts 5 are preferably identical in construction. This offers the advantage of a smaller variety of components, which in turn is accompanied by a corresponding reduction in production costs.

Alternatively or in addition thereto, the projections 9 of the window mount(s) 5 are arranged coplanar in one plane, for example. In this case, the contact surfaces 11 of each set of contact surfaces 11 are also each arranged in a plane corresponding to the associated installation depth.

One embodiment provides that the window mount(s) 5 each have an adjustable clamping device 27, by means of which the window 7 can be clamped or is clamped in the respective window mount 5 with the interposition of a window seal 29. The clamping device 27 is designed in such a manner that a compression of the window seal 29 can be adjusted via its setting, which causes a fine adjustment of the window 7, corresponding to the compression, within the window mount 5 in a direction parallel to the longitudinal axis of the window mount 5. This configuration offers the advantage that a corresponding fine adjustment of the optical path length L adjusted by the selected installation depth(s) of the window mount(s) 5 is also effected at the same time.

The clamping devices 27, shown in FIG. 3 as exemplary embodiments for this purpose, each comprise a screw ring 31, which can be screwed or is screwed into the respective window mount 5 and by means of which an outer edge of the window 7 and the window seal 29 adjacent thereto can be clamped or is clamped between the screw ring 31 and a counter bearing 33 of the clamping device 27 in a manner adjustable via the screw-in depth of the screw ring 31. The counter bearings 33, shown as examples in FIG. 3, each comprise a radially inward extending shoulder of the window mount 5, which on the outside on all sides surrounds an opening 35 of the respective window mount 5 facing the interior space of the measuring cell 1 when the window mount 5 is installed.

In FIG. 3, the window seals 29 of both window mounts 5 are each arranged between the outer edge of the window 7 and the counter bearing 33. This configuration provides a sealing between the interior space of the window mounts 5 and the interior space of the measuring cell 1. In addition, in FIG. 3, a process seal 37 is provided for each window mount 5 for sealing an annular gap existing between the window mount 5 and the wall of the measuring cell 1 bounding the recess 3 on the outside, when the window mount 5 is installed. For this purpose, the window mounts 5 may have, for example, a groove 39 extending around the outside of their circumference for receiving the process seals 37.

Disk-shaped windows are particularly suitable as windows 7. A disk thickness of the window 7 may be limited to a minimum required to achieve sufficient compressive strength, such as a disk thickness of 1 mm to 5 mm. This minimal thickness offers the advantage that they can be produced cost-effectively.

One embodiment provides that the windows 7 are each inserted substantially flush with the front in a front region of the respective window mount 5 facing the interior space of the measuring cell 1 in the installed state. Alternatively or additionally, a region of the or each window mount 5 projecting into the interior space of the measuring cell 1 in the installed state preferably has a rounded outer contour in each case. Both, in particular in conjunction with measuring cells 1 configured as flow cells, offer the advantage that disturbances, caused by the projecting regions, of the flow of the medium flowing through the flow cell are significantly reduced. This largely avoids swirls and/or turbulence that could affect the measurements. This is particularly advantageous for small optical path lengths L.

With regard to the fastening of the window mount(s) 5, fastening means 41 of different embodiments can be used. One embodiment, shown in FIGS. 4a-4d, provides for the use of screws as fastening means 41, which can be screwed or are screwed into the measuring cell body 23 through the projections 9. Alternatively, however, another form of fastening of the window mount(s) 5 may be used.

The invention claimed is:

1. A measuring cell for performing optical measurements of at least one measured variable of a medium disposed in the measuring cell or flowing through the measuring cell, the measuring cell comprising:
   a first recess extending through a first outer wall of the measuring cell and/or a second recess extending through a second outer wall of the measuring cell opposite the first outer wall; and
   one or two window mounts, each including a transparent window, wherein the window mount, at least one of the window mounts or each window mount, respectively:
   comprises a predetermined number of at least two distinct, radially outwardly protruding projections distributed around an outer lateral perimeter of the respective window mount; and
   is configured to be inserted or is inserted into a respective recess of the first and/or second recess assigned to the respective window mount at an installation depth selectable from at least two different installation depths,
   wherein a wall of the measuring cell surrounding the respective recess on all sides includes a set of contact surfaces for each one of the selectable installation depths, formed in an exterior face of the wall, wherein:
   each set of contact surfaces includes a corresponding contact surface for each one of the projections; and
   the contact surfaces of each set of contact surfaces are distributed around a longitudinal axis of a respective recess of the first and/or second recesses and are each arranged at an axial height along the longitudinal axis of the respective recess such that the window mount is insertable in the respective recess to a selected installation depth when its projections are aligned with the contact surfaces corresponding to the selected installation depth and each projection rests on one of the contact surfaces of the set of contact surfaces for the selected installation depth.

2. The measuring cell according to claim 1, wherein the measuring cell is configured as a flow cell and/or as a disposable measuring cell.

3. The measuring cell according to claim 1, comprising two window mounts of identical construction, one or both of which can be inserted or is inserted into the corresponding recess at the installation depth selected from the at least two different installation depths.

4. The measuring cell according to claim 1, wherein:
   the projections of the or each window mount are each arranged coplanar in a plane; and
   the contact surfaces of each set of contact surfaces are each arranged in a plane corresponding to the associated installation depth.

5. The measuring cell according to claim 1, further comprising a measuring cell body, which:
   surrounds and defines an interior space of the measuring cell;
   comprises the wall(s) surrounding the recess(es); and
   comprises the sets of contact surfaces.

6. The measuring cell according to claim 5, wherein the measuring cell body:
   is configured as a one-piece body;
   is made of a plastic and/or of a sterilizable material; and/or
   is designed as an injection-molded part.

7. The measuring cell according to claim 1, wherein the recess, at least one of the recesses or each recess comprises a region that extends through a connection piece that is externally adjacent to or integrally formed on the outer wall through which the respective recess extends.

8. The measuring cell according to claim 1, wherein the or each window mount comprises an adjustable clamping device, by which the corresponding window can be clamped or is clamped in the respective window mount with an interposing window seal, and
   which is configured such that a compression of the window seal can be adjusted via the clamping device, which causes a fine adjustment of the window, corresponding to the compression, within the window mount in a direction parallel to the longitudinal axis of the window mount.

9. The measuring cell according to claim 8, wherein the or each clamping device comprises a screw ring, which can be screwed or is screwed into the respective window mount, and by means of which an outer edge of the window and the window seal adjacent thereto can be clamped or is clamped between the screw ring and a counter bearing of the clamping device in a manner that can be adjusted via the screw ring.

10. The measuring cell according to claim 9, wherein the or each counter bearing comprises a radially inward extending shoulder of the window mount, which on the outside on all sides surrounds an opening of the respective window mount facing an interior space of the measuring cell when the window mount is installed therein.

11. The measuring cell according to claim 1, wherein:
   a process seal is provided for each window mount configured to seal an annular gap between the window mount and the wall of the measuring cell bounding the recess on the outside when the window mount is installed therein, each window mount includes a groove extending around the outside of a circumference of the window mount, which groove is configured to receive the process seal; and/or each window is disk-shaped, is configured as a disk-shaped window with a disk thickness of 1 mm to 5 mm, and/or is inserted substantially flush with a front in a front region of the respective window mount facing an interior space of the measuring cell in the installed state.

12. The measuring cell according to claim 1, wherein a region of the or each window mount projecting into an interior space of the measuring cell in the installed state has a rounded outer contour in each case.

13. The measuring cell according to claim 1, wherein the measuring cell comprises fastening means:

configured to fasten the or each window mount; and/or comprising screws configured to be screwed through the projections into the measuring cell body of the measuring cell.

14. The measuring cell according to claim 1, wherein the number of radially outward protruding projections is three or more.

15. A measuring device comprising a measuring cell according to claim 1 and an optical sensor configured to measure the at least one measured variable of the medium disposed in the measuring cell or flowing through the measuring cell.

16. The measuring device according to claim 15, wherein the optical sensor is:

a turbidity sensor configured to measure a turbidity of the medium;

a sensor configured to measure a solids concentration contained in the medium;

a fluorescence sensor;

an absorption sensor;

a sensor configured to measure a spectral absorption coefficient; or a sensor configured to measure a concentration of an analyte contained in the medium.

17. The measuring device according to claim 15, wherein the optical sensor comprises a transmitting device and an optical measuring device, wherein the transmitting device is configured to be positioned outside the measuring cell such that transmitted radiation can be transmitted into the measuring cell by the transmitting device, and wherein the optical measuring device or at least one detector of the optical measuring device is configured be positioned outside the measuring cell such that measurement radiation, which results from an interaction of the transmitted radiation along an optical path extending through the medium disposed in the measuring cell or flowing through the measuring cell, emerges from the measuring cell is received by the optical measuring device.

18. The measuring device according to claim 17, wherein the transmitting device is a light source.

19. The measuring cell according to claim 1, wherein each projection is a boss, an arm, and/or a tab.

* * * * *